(12) United States Patent
Fiedler

(10) Patent No.: US 6,982,741 B2
(45) Date of Patent: Jan. 3, 2006

(54) METHOD AND APPARATUS FOR CODING LIVE IMAGES IN MICROSCOPY

(75) Inventor: Frank Fiedler, Wetzlar (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 816 days.

(21) Appl. No.: 09/863,701

(22) Filed: May 23, 2001

(65) Prior Publication Data

US 2001/0048467 A1    Dec. 6, 2001

(30) Foreign Application Priority Data

May 27, 2000  (DE) ............................... 100 26 392

(51) Int. Cl.
  *H04N 7/18*         (2006.01)
(52) U.S. Cl. ...................... 348/79; 382/133; 358/453
(58) Field of Classification Search ................. 348/79, 348/80, 292, 295, 46; 386/46; 375/240.01; 358/453, 280; 382/133
  See application file for complete search history.

(56) References Cited

U.S. PATENT DOCUMENTS

| | | | |
|---|---|---|---|
| 4,673,988 A * | 6/1987 | Jansson et al. ............. | 358/453 |
| 5,216,596 A | 6/1993 | Weinstein .............. | 364/413.02 |
| 5,548,661 A * | 8/1996 | Price et al. ................. | 382/133 |
| 6,101,265 A * | 8/2000 | Bacus et al. ................ | 382/133 |
| 6,226,392 B1 * | 5/2001 | Bacus et al. ................ | 382/128 |
| 6,259,473 B1 * | 7/2001 | Iko et al. ...................... | 348/80 |
| 6,429,897 B2 * | 8/2002 | Derndinger et al. ........ | 348/295 |
| 6,650,703 B1 * | 11/2003 | Schwarzmann et al. ..................... | 375/240.01 |
| 6,711,283 B1 * | 3/2004 | Soenksen .................... | 382/133 |

* cited by examiner

Primary Examiner—Gims Philippe
(74) Attorney, Agent, or Firm—Simpson & Simpson, PLLC

(57) ABSTRACT

The method for coding live images in microscopy makes possible the recording of a first complete image ($25_1$) that depicts a portion of a microscopic preparation (14a). A first coded complete image (200) is generated therefrom and is stored in a buffer memory (27). The first coded complete image ($25_1$) can moreover be output, for example, on a monitor. When a second complete image ($25_2$) is recorded, only a part is processed and transmitted. That part corresponds to the offset of an X-Y stage (12). The coordinates of the portion of the second complete image ($25_2$), and further control data, are transferred to a control data decoder (26). A correspondingly assembled and coded complete image (210) is generated in an image assembler (32), the at least one coded partial image (220) and the preceding coded complete image located in the buffer memory (27) being used.

10 Claims, 4 Drawing Sheets

METHOD AND APPARATUS FOR CODING LIVE IMAGES IN MICROSCOPY

CROSS REFERENCE TO RELATED APPLICATIONS

This application claims priority of the German patent application DE 100 26 392.5 filed May 27, 2000 which is incorporated by reference herein.

FIELD OF THE INVENTION

The invention concerns a method for coding live images in microscopy. In particular, the invention concerns a method in which the microscope images that are recorded are partially coded. Displacement of the X-Y stage induces an offset of a portion of the previously recorded image; it is sufficient if only the new image portion is coded and transmitted.

The invention furthermore concerns an arrangement for coding live images in microscopy. In particular, the invention concerns a system that improves, in terms of transmitted image quality, the transmission of microscope images from a microscope to a remote station.

BACKGROUND OF THE INVENTION

In existing video coding as presently practiced, algorithms are used inside the codec to recognize image changes, in order to find the image portions that are to be compressed. The calculation time needed to discover such image changes (a person's head has moved, etc.) is relatively long and, together with the transmission bandwidth, limits the number of moving images that can be processed per second.

U.S. Pat. No. 5,216,596 discloses a telepathology system. A workstation is set up at a remote location and receives images from a preparation (tissue) that is to be examined with a microscope. The microscope images are recorded with a conventional video camera, and displayed at the remote location on a conventional video monitor. A or coding of the image data is accomplished after imaging. The system presented here is tied to analog transmission links, and cannot achieve the necessary resolution in a conventional digital network. Coding is also ruled out because of the analog transmission.

SUMMARY OF THE INVENTION

It is an object of the invention to create a method with which an increase in video image rate and a reduction in compression outlay can be achieved in the context of the transmission of live microscope images over digital networks. The method is also intended to make it possible to enhance display quality, i.e. to prevent flicker effects due to continuous image transmission even when images are stationary.

According to the present invention, this is achieved by a method that comprises the following steps:

a) recording a first complete image that depicts a portion of a microscopic preparation;

b) generating a first coded complete image in a coding element;

c) storing the first coded complete image in a buffer memory;

d) outputting the first coded complete image;

e) recording a second complete image that is offset with respect to the preceding complete image in a plane defined by an X-Y stage;

f) transferring the coordinates of the portion of the second complete image, and further control data, to a control data decoder;

g) generating at least one coded partial image utilizing the data from the control data decoder;

h) generating an assembled and coded complete image in an image assembler, using the at least one coded partial image and the preceding coded complete image located in the buffer memory;

i) outputting a second assembled and coded complete image, the assembled and coded complete image also being stored in the buffer memory for that purpose; and j) recording further images, steps f) through i) being repeated for each further image.

A further object of the invention is to create an arrangement which makes possible flicker-free image transmission of live microscope images at an increased image rate.

According to the present invention, this is achieved by an arrangement which comprises a coder to which complete images can be transferred, the coder comprising a coding unit that is connected to a buffer memory; a control data decoder being connected to the coding unit, to the buffer memory, and to an image assembler; and the image assembler receiving data from the buffer memory and transferring data to the buffer memory.

One advantage of the invention is an increase in the video image rate and a reduction in compression outlay in the transmission of live microscope images over digital networks. In addition, display quality is enhanced, i.e. flicker effects due to continuous image transmission even when images are stationary, or flickering due to continuous compression, are prevented. Compression of the image data is accomplished with several commercially common algorithms, in order to adhere to existing video compression standards.

A further advantage of the invention is that the coder/decoder algorithm according to the present invention takes into account the circumstance that the status data of an automatic microscope are utilized for video coding of moving images or live images from a microscope. In microscopic examinations, no unexpected movements occur within the image. The movements of the specimen or preparation are usually only displacements in the three spatial coordinates X, Y, and Z. Using this additional information, the coding time for the image that is to be transmitted can be considerably shortened, data volume is reduced, and a higher moving-image rate or better image quality (due to less-severe compression) is achieved. The algorithm used here utilizes additional input data; i.e. one control channel and two data channels with additional information are additionally used, as well as the image data, as input for the coder. The control channel contains information for controlling the partial coding of the input image. The data required for this (e.g. X-Y position, color values, etc.) are conveyed via the two additional data channels.

BRIEF DESCRIPTION OF THE DRAWINGS

The drawings schematically depict the subject matter of the invention, which is described below with reference to the Figures. In the drawings.

DETAILED DESCRIPTION OF THE INVENTION

Figure 1:
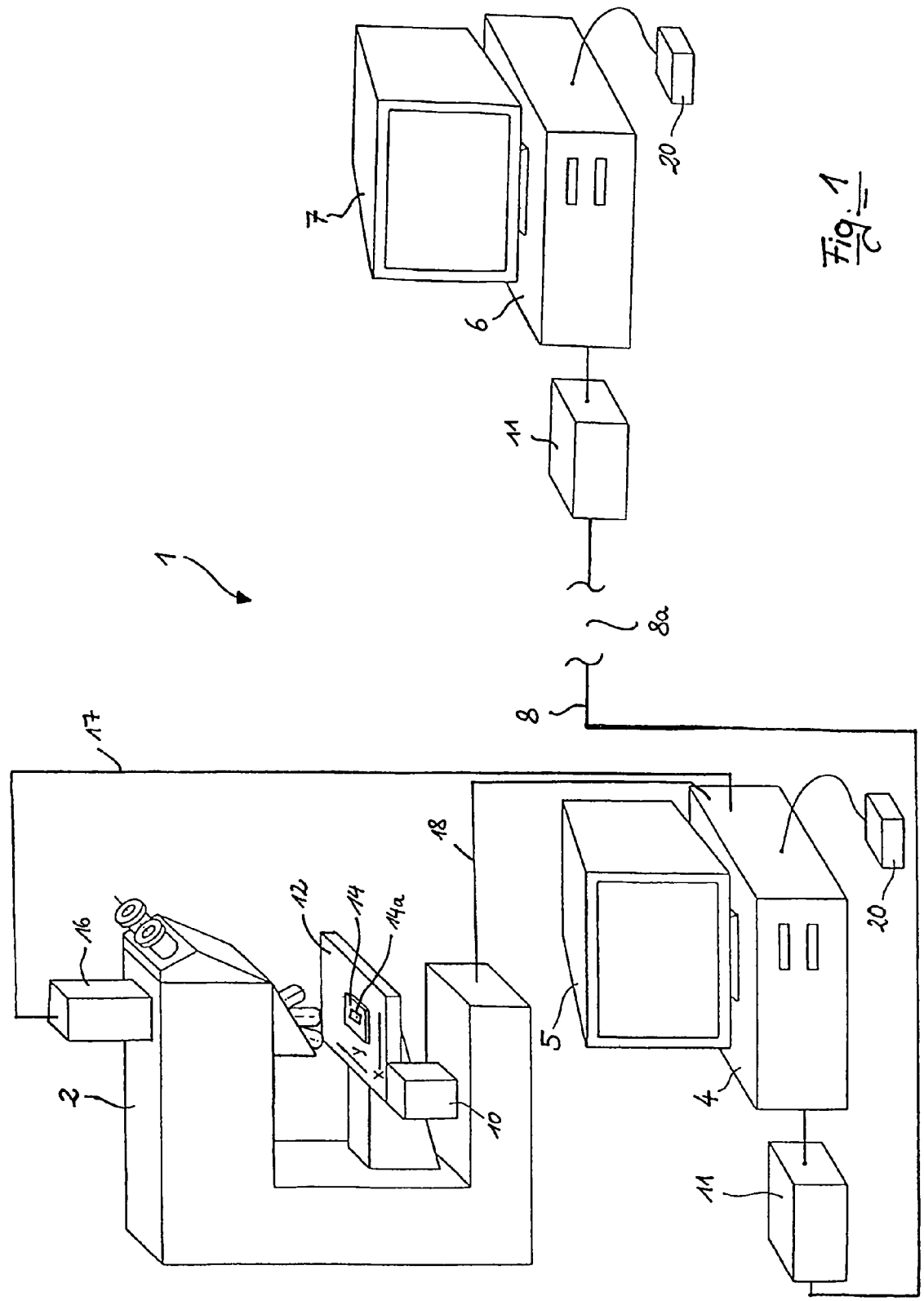
FIG. 1 schematically depicts a system in which the invention is applied.

System 1 depicted in FIG. 1 comprises a microscope 2 that is set up at a location where preparations (tissue sections) for examination are being produced. The location is usually a histology or pathology department of a hospital. A first computer 4 having a monitor 5 is associated with microscope 2. A second computer 6, also having a monitor 7, is connected to first computer 4 via a conventional network 8. The network is represented in FIG. 1 by a connecting line having an interruption 8$a$, the better to illustrate that second computer 6 can in principle be installed at any desired distance from first computer 4.

In the exemplary embodiment depicted here, microscope 2 is depicted as an automatic microscope. All the imaging parameters of microscope 2 can be set and modified, for example, from second computer 6. In this case microscope 2 possesses corresponding motors for setting the parameters. FIG. 1 depicts a motor 10 that makes possible displacement of an X-Y stage 12. Motors for changing the imaging scale, moving X-Y stage 12 in the Z direction, and/or focusing are not depicted for reasons of clarity. The arrangement and use of these motors is, however, evident to one skilled in the art. First computer 4 usually serves to record the image data from microscope 2 and convert it into a corresponding data format for transfer via network 8. A compression of the image data can also be performed by first computer 4. In addition, microscope 2 is also equipped with position sensors (not depicted), which supply to first computer 4 signals which provide information about the X, Y, and Z position of X-Y stage 12. It is also conceivable for X-Y stage 12, or individual components of the microscope, to supply signals which allow a position determination. First computer 4 is also responsible for receiving data from second computer 6 in order to control microscope 2, and for converting them into corresponding control signals. First and second computers 4 and 6 are used for communication via network 8, "communication" being understood to mean data transfer in both directions.

A specimen slide 14, with a preparation 14$a$ on it, is placed on X-Y stage 12. Depending on the selected magnification, an image window (not depicted) is imaged and is recorded by a camera 16. Camera 16 can be configured, for example, as a conventional video camera or CCD camera. Camera 16 is connected via a connection 17 to first computer 4. A further connection 18, over which control signals are sent to the corresponding motors, exists between first computer 4 and microscope 2. Control signals are conveyed via network 8 from second computer 6 to first computer 4. Image data are similarly conveyed via network 8 from first computer 4 to second computer 6. The two computers 4 and 6 can each be equipped with a WAN module 11 (ISDN, ASDL, ATM, satellite) that serves to establish a connection. An input unit 20 for user inputs is also connected to each computer 4 and 6. Input unit 20 can be configured as a mouse, keyboard, or voice control unit.

Figure 2:
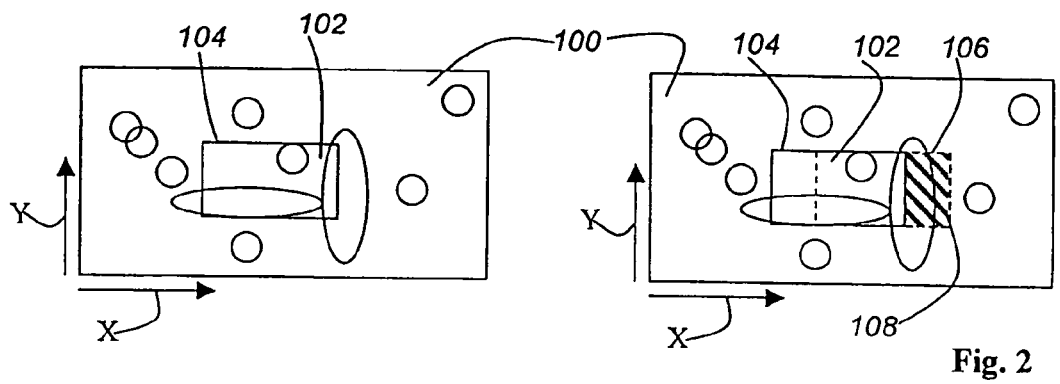
FIG. 2 schematically depicts the recording of an image of a preparation, the position of the X-Y stage having been modified in the X position.
Figure 3:
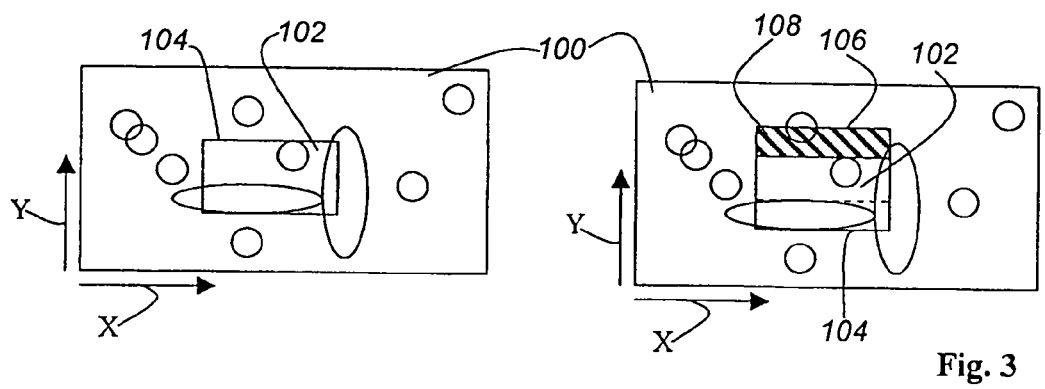
FIG. 3 schematically depicts the recording of an image of a preparation, the position of the X-Y stage having been modified in the Y position.
Figure 4:
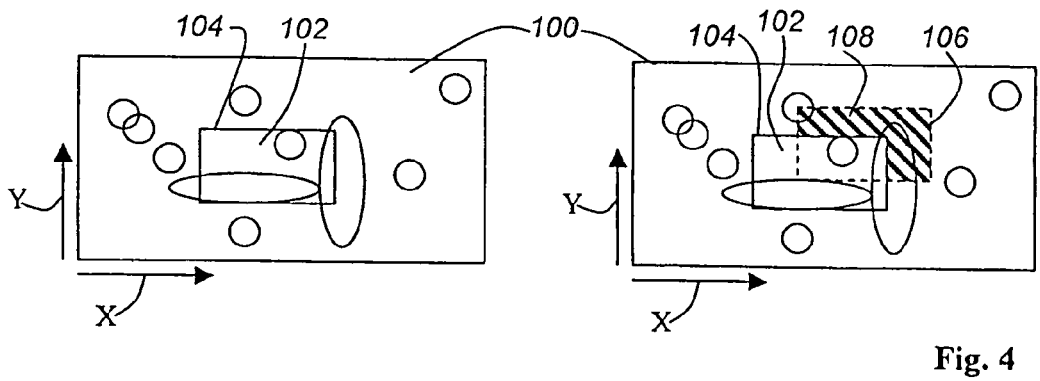
FIG. 4 schematically depicts the recording of an image of a preparation, the position of the X-Y stage having been modified in the X and Y positions.

FIGS. 2 through 4 illustrate the imaging of a portion of a tissue section 100. A first image 102 is recorded by a video camera or CCD camera. The camera defines a first image frame 104 that is depicted in FIGS. 2 through 4 with solid lines. X-Y stage 12 (see FIG. 1) is displaced in the X direction, and this results in an offset image frame 106 that is depicted in FIG. 2 with dashed lines. The difference between first image frame 104 and offset image frame 106 is a cross-hatched area 108.

In FIG. 3, the X-Y stage is displaced in Y direction Y, and this results in an offset image frame 106 that in FIG. 3 is again depicted with dashed lines. The difference between first image frame 104 and offset image frame 106 is again a cross-hatched area 108.

In FIG. 4, the X-Y stage is displaced in X direction X and in Y direction Y, and this results in an offset image frame 106 that in FIG. 4 is again depicted with dashed lines. The difference between first image frame 104 and offset image frame 106 is a cross-hatched area 108.

The arrangement must furthermore make a comparison to determine whether the recorded image has experienced any change in the Z direction. It is then also necessary to detect any changes in the image content in which the new image encompasses a region that is completely outside the region of the preceding image. Suitable processing and identification methods are available for this purpose.

In order to improve the transmission of the recorded microscope images to a remote station and to increase the transmission speed, it is sufficient to transmit only the portion of the image that results from the offset by X-Y stage 12. As is apparent from FIGS. 2 through 4, only cross-hatched area 108 of offset image frame 106 needs to be transmitted to yield a complete image at the receiving end.

Figure 5:
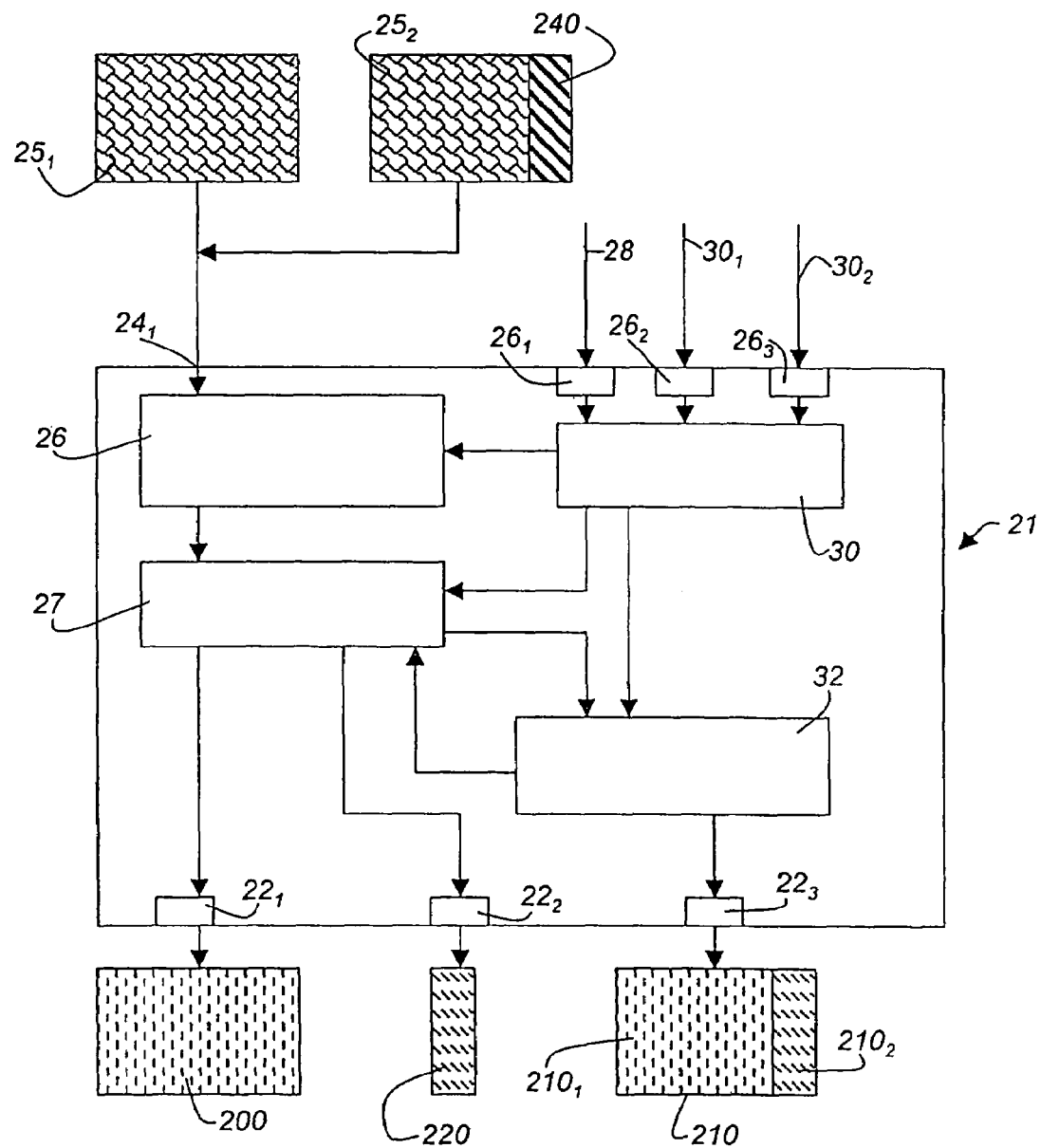
FIG. 5 shows a schematic configuration of a coder.

FIG. 5 depicts a schematic configuration of a coder 21 for preparing for image transmission. At the beginning of the coding process, the type of image output must be defined. In this exemplary embodiment, coder 21 possesses three outputs. A coded complete image 200 that is completely coded is output at a first output $22_1$. A coded partial image 220 that is partially coded is output at a second output $22_2$. An assembled and coded complete image 210 that comprises several partial images $210_1$ and $210_2$ is output at third output $22_3$. Each of the partial images $210_1$ and $210_2$ is partially coded, and is correspondingly assembled into a coded complete image 210. Coder 21 furthermore possesses four inputs. The image data of the input image (a first complete image $25_1$) are transferred to coder 21 via a first input $24_1$. First complete image $25_1$ can, for example, be recorded by way of a video camera or CCD camera (not depicted).

The first recorded complete image $25_1$ is transferred to a coding element 26 and is always completely coded. The coded image is then stored in a buffer memory 27. A complete image can be output at first output $22_1$. If, for example, X-Y stage 12 is displaced, a second complete image $25_2$ is again recorded. In the example described here, the difference between the second recorded complete image $25_2$ and the first recorded complete image $25_1$ is a cross-hatched area 240. The second recorded complete image $25_2$ is again conveyed to coding element 26. The procedure is the same for all further recorded images.

Coder 21 possesses a control data decoder 30 that has three inputs. A first input $26_1$ is connected to a control channel 28 that supplies information for controlling partial coding of the input image. A first data channel $30_1$ is connected to a second input $26_2$, and a second data channel $30_2$ to a third input $26_3$. First and second data channels $30_1$ and $30_2$ supply, for example, information about the X-Y position of the X-Y stage, color values, or the like. Images that are recorded after the first recorded complete image $25_1$ are partially or completely coded as a function of the information from control data decoder 30.

Coder 21 also possesses an image assembler 32 which also receives information from control data decoder 30 in order to assemble the coded partial images $210_1$ and $210_2$ into a coded complete image 210. Assembly of coded partial images $210_1$ and $210_2$ into a complete image 210 is necessary when, as depicted in FIG. 5, the difference between the first recorded complete image $25_1$ and the subsequently recorded complete image $25_2$ is, for example, cross-hatched area 240. A datum is also sent from control data decoder 26 to buffer memory 27 so that the image information necessary for assembly of a complete image is sent to image assembler 32. Once a complete image 210 has been generated from the coded partial images $210_1$ and $210_2$, it can be output via third output $22_3$. In addition, the newly generated complete image 210 is stored in buffer memory 27 and thus constitutes a basis for possible assembly of a newly recorded input image.

In addition to the pure image data, a coded complete image 210 or partial image 220 additionally contains information about the type of coding (complete/partial) and, in the case of partially coded images, information about the location of the image in the overall image.

Figure 6:
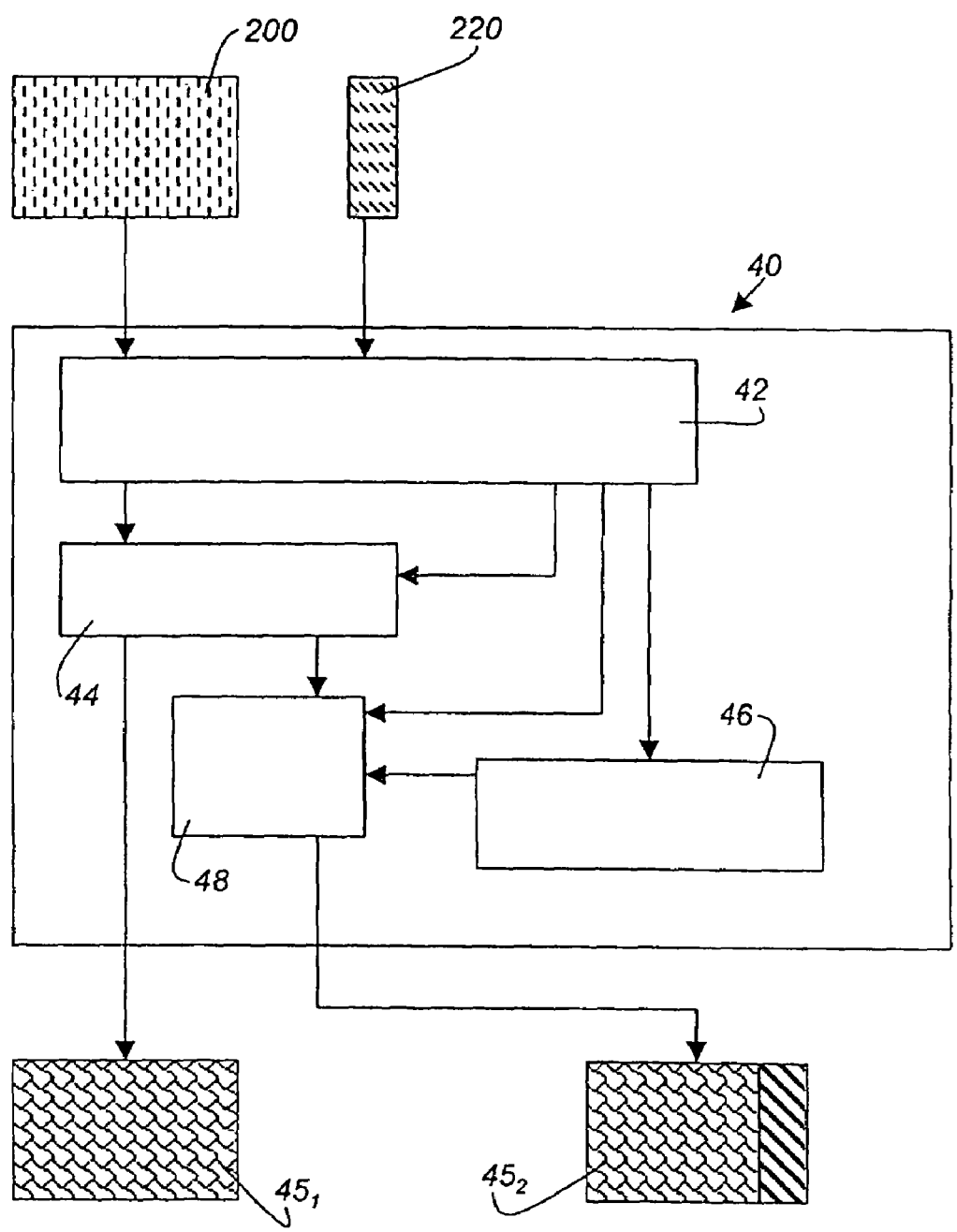
FIG. 6 shows a schematic configuration of a decoder.

FIG. 6 shows a schematic configuration of a decoder 40. As already mentioned above, the input images for decoder 40 are the coded complete image 200 or coded partial image 220 of FIG. 5. These images also contain, in addition to the pure image information, information about the type of coding (complete image 200/partial image 220). In the case of the partially coded images, data concerning the position of the partial image in the overall image are additionally analyzed as input data. As already mentioned with reference to coding, the first image that is transmitted is a complete image 200.

Decoder 40 possesses a control data decoder 42 that ascertains the corresponding position data and/or control data from complete image 200 or partial image 220 that is received. As already mentioned with regard to FIG. 5, the first image recorded is always a complete image 200, which is output from coder 21 as coded image 200. A corresponding procedure is used in decoder 40. Control data decoder 42 receives the coded complete image 200 and forwards it to a decoder unit 44. The coded complete image 200 is converted into a decoded complete image $45_1$ and output. The decoded complete image $45_1$ corresponds to the first recorded complete image $25_1$ before coding. The first decoded complete image $45_1$ is additionally stored in decoder buffer memory 46. The procedure is the same for all further complete images: decode, buffer memory, output.

Coded partial images 220 are also transferred to control data decoder 42 and decoded, and then, as a function of the additional data (position in the overall image, etc.), combined in an image assembler 48 with the preceding image to form a decoded complete image $45_2$. This complete image $45_2$ is stored in decoder buffer memory 46 as the new preceding image, and additionally output. Monitor 5, 7 respectively associated with first or second computer 4, 6 is usually used as the output medium.

The invention has been described with reference to one particular embodiment. It is self-evident, however, that changes and modifications can be made without thereby leaving the scope of protection of the claims recited hereinafter.

PARTS LIST

2 Microscope
4 First computer
5 Monitor
6 Second computer
7 Monitor
8 Network
10 Motor
11 WAN module
12 X-Y stage
14 Specimen slide
14a Preparation
16 Camera
17 Connection
18 Further connection
20 Input unit
21 Coder
$22_1$ First output
$22_2$ Second output
$22_3$ Third output
$24_1$ First input
$25_1$ First complete image
$25_2$ Second complete image
26 Coding element
$26_1$ First input
$26_2$ Second input
$26_3$ Third input
27 Buffer memory
28 Control channel
30 Control data decoder
$30_1$ First data channel
$30_2$ Second data channel
32 Image assembler
40 Decoder
42 Control data decoder
44 Decoder unit
$45_1$ First decoded complete image
$45_2$ Second decoded complete image
46 Decoder buffer memory
48 Image assembler
100 Tissue section
102 First image
104 First image frame
106 Offset image frame
108 Cross-hatched area
200 Complete image
210 Coded complete image
$210_1$ Partial image
$210_2$ Partial image
220 Coded partial image
240 Cross-hatched area

What is claimed is:

1. A method for coding live images in microscopy, comprising in order the following steps:
   a) recording a first complete image ($25_1$) that depicts a portion of a microscopic preparation (14a);
   b) generating a first coded complete image (200) in a coding element (21);
   c) storing the first coded complete image in a buffer memory (27);
   d) outputting the first coded complete image ($25_1$);
   e) recording a second complete image ($25_2$) that is offset with respect to the preceding complete image in a plane defined by an X-Y stage (12);

f) transferring the coordinates of the portion of the second complete image ($25_2$), and further control data, to a control data decoder (30);

g) generating at least one coded partial image utilizing the data from the control data decoder (30);

h) generating an assembled and coded complete image (210) in an image assembler (32), using the at least one coded partial image (220) and the preceding coded complete image located in the buffer memory (27);

i) outputting a second assembled and coded complete image (210), the assembled and coded complete image (210) also being additionally stored in the buffer memory (27); and j) recording further images, steps f) through i) being repeated for each further image.

2. The method as defined in claim 1, characterized in that a coded partial image (220) is output at a second output (222) of the coder (21).

3. The method as defined in claim 1, characterized in that the coder (21) makes available three output forms—a) complete images, completely coded; b) complete images assembled from coded partial images; and c) partial images—for output of the coded images; and that the image information additionally contains information as to coding and the location of the image in the overall image.

4. The method as defined in claim 3, characterized in that the images recorded are always complete images.

5. The method as defined in claim 1, characterized in that coded complete images (200, 210) are transmitted to a remote station, a decoded complete image being generated at the remote station.

6. The method as defined in claim 5, characterized in that at least one coded partial image is transmitted to the remote station, an assembled decoded complete image being generated at the remote station.

7. An arrangement for coding live images in microscopy, comprising a coder (21) to which complete images ($25_1$) can be transferred, the coder (21) comprising a coding unit (26) that is connected to a buffer memory (27); a control data decoder (30) being connected to the coding unit (26), to the buffer memory (27), and to an image assembler (32); and the image assembler (32) receiving data from the buffer memory (27) and transferring data to the buffer memory (27) wherein coded complete images and coded partial images can be output from the buffer memory (27); and that assembled and coded complete images (210) can be output from the image assembler (32).

8. The arrangement as defined in claim 7, characterized in that the data of an assembled and coded complete image (210) can additionally be stored for output in the buffer memory (27).

9. The arrangement as defined in claim 7, characterized in that a decoder (40) that is arranged in physically separate fashion from the coder (21) is provided; and that the decoder (40) receives coded partial images (220) and coded complete images (200), and generates decoded complete images ($45_1$) and assembled and decoded complete images ($45_2$) therefrom.

10. The arrangement as defined in claim 9, characterized in that the decoder (40) comprises a control data decoder (42) that ascertains the corresponding position data and/or control data from the coded complete image (200) or partial image (220) that is received, a decoder unit (44), an image assembler (48), and a decoder buffer memory (46).

\* \* \* \* \*